United States Patent
Hornung et al.

(10) Patent No.: US 10,331,977 B2
(45) Date of Patent: *Jun. 25, 2019

(54) METHOD FOR THE THREE-DIMENSIONAL DETECTION OF OBJECTS

(71) Applicant: SICK AG, Waldkirch (DE)

(72) Inventors: Armin Hornung, Waldkirch (DE); Matthias Neubauer, Waldkirch (DE)

(73) Assignee: SICK AG, Waldkirch (DE)

( * ) Notice: Subject to any disclaimer, the term of this patent is extended or adjusted under 35 U.S.C. 154(b) by 47 days.

This patent is subject to a terminal disclaimer.

(21) Appl. No.: 15/433,065

(22) Filed: Feb. 15, 2017

(65) Prior Publication Data
US 2017/0255844 A1 Sep. 7, 2017

(30) Foreign Application Priority Data
Mar. 3, 2016 (EP) ..................... 16158357

(51) Int. Cl.
| | |
|---|---|
| *G06K 9/00* | (2006.01) |
| *G06K 9/62* | (2006.01) |
| *G06K 9/36* | (2006.01) |
| *G01B 11/25* | (2006.01) |
| *G06K 9/20* | (2006.01) |
| *G06K 9/52* | (2006.01) |
| *G06T 7/521* | (2017.01) |
| *G06K 9/46* | (2006.01) |

(52) U.S. Cl.
CPC ........ *G06K 9/6267* (2013.01); *G01B 11/2513* (2013.01); *G06K 9/00624* (2013.01); *G06K 9/2036* (2013.01); *G06K 9/52* (2013.01); *G06T 7/521* (2017.01); *G06K 2009/4666* (2013.01)

(58) Field of Classification Search
None
See application file for complete search history.

(56) References Cited

U.S. PATENT DOCUMENTS

| 8,649,025 B2 | 2/2014 | Teodorescu | |
|---|---|---|---|
| 2010/0303294 A1* | 12/2010 | Zschau | .................. A61B 3/113 |
| | | | 382/103 |
| 2015/0002628 A1 | 1/2015 | Reif | |

OTHER PUBLICATIONS

Rublee, Ethan et al; "ORB: An efficient alternative to SIFT or SURF", 2011 IEEE International Conference, Nov. 6, 2011, pp. 2569-2571.
Calonder, Michael et al; "BRIEF: Binary Robust Independent Elementary Features", Computer Vision—ECCV 2010; Sep. 5, 2010, pp. 778-792.
European search report dated Aug. 17, 2016 for corresponding EP application 16158357.0.
Ylioinas, Juha, et al; "Learning Local Image Descriptors Using Binary Decision Trees"; Center for Machine Vision Research University of Oulu; pp. 347-354.

* cited by examiner

*Primary Examiner* — Randolph I Chu
(74) *Attorney, Agent, or Firm* — Nath, Goldberg & Meyer; Jerald L. Meyer

(57) ABSTRACT

The present invention relates to a method for the three-dimensional detection of objects, in which an image is detected and is compared to a known reference image and mutually corresponding objects in the images are identified by means of a correlation process. A binarization scheme is used in the correlation process and compares randomly selected point pairs to one another. The point pairs are fixed by means of a plurality of iterations.

18 Claims, 2 Drawing Sheets

METHOD FOR THE THREE-DIMENSIONAL DETECTION OF OBJECTS

Figure 1:
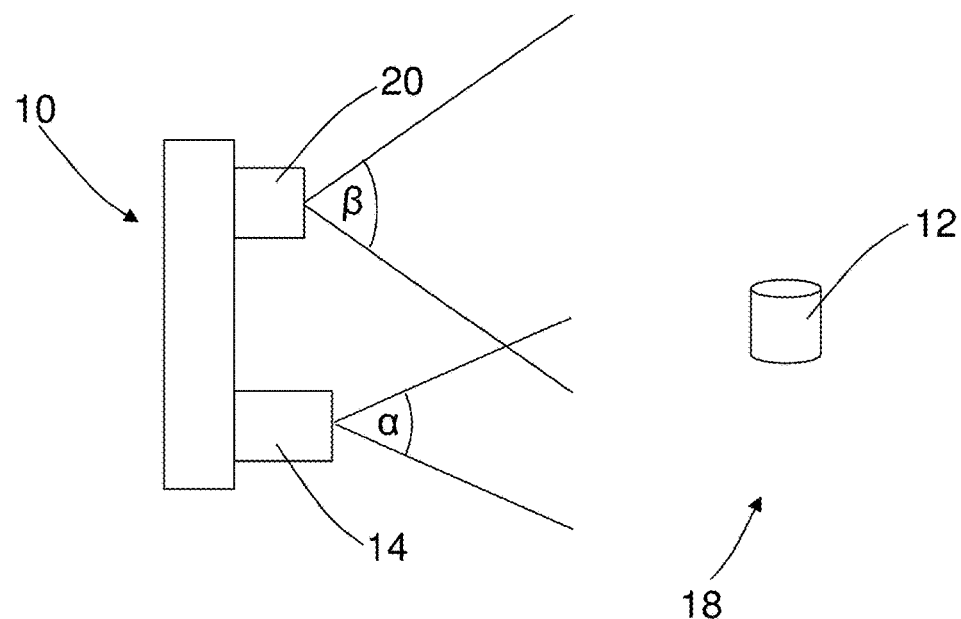

The present invention relates to a method for the three-dimensional detection of objects, in which a scene is detected by means of an image detection device, wherein a camera image is produced. The scene is further illuminated by a pattern which is irregular at least locally, wherein an image is produced as a reference image in accordance with the pattern. Subsequently, a correlation window is fixed as a section of the first camera image and a plurality of search windows are fixed as sections of the reference image, wherein different search windows reproduce different regions of the reference image. The search window which corresponds to the correlation window is thereupon determined by means of a correlation process.

Methods for the three-dimensional detection of objects are generally known and are e.g. used in machine vision applications in order to detect and recognize objects, persons and the like. For example, the position of a person in a space or even the position of individual limbs (e.g. the hands) of the person can be determined by means of such methods.

For this purpose, a scene can be detected by an image detection device, wherein the image detection device is arranged spaced apart from a pattern illumination device or illumination device. An image is produced by means of the image detection device, in which image an object to be detected is, for example, shown at a different position in the detected image. The object itself is not shown in the reference illuminated image. Only a specific pattern section which is associated with a specific spacing or which is only visible on the object in the camera image. A detected object includes a specific section of the structured pattern of the illumination or of the reference image on the basis of its distance or depth.

A correlation window can be fixed as a section of the image of the image detection device. By using a plurality of search windows in a correlation process, that search window in which the section of the structured pattern of the correlation window can likewise be located can subsequently be determined.

Due to the different positions of the pattern section associated with the object to be detected in the camera image and in the reference image, an angle of the image detection device and of the illumination device from the object can be determined, whereupon the spacing of the object from the image detection device and thus the spatial position of the object can be determined by means of triangulation.

The so-called census process in which the brightness of different pixels is compared to a respective central pixel within the correlation window can, for example, be used as a correlation process. A binary value is formed for each comparison from the respective comparisons with the central pixel, wherein a census vector is formed from all the binary values and describes the relative brightness distribution or gray value distribution in the search window. The produced census vectors can then, for example, be compared to one another in the correlation process in order to locate the same object as reliably as possible in the camera image and in the reference image.

Alternatively to the census process, the so-called BRIEF process can e.g. also be used which is described in "Calonder et. al—BRIEF: Computing a Local Binary Descriptor Very Fast. IEEE Transactions on Pattern Analysis and Machine Intelligence 2012" and "Zhang et. al—Binary stereo matching. ICPR 2012".

Very large correlation windows and very long census vectors are required in order, for example, to provide a good correlation between the correlation window (camera image) and the corresponding search window (reference image) by means of the census process. However, large correlation windows worsen the object resolution, whereby small objects can no longer be recognized or can only be recognized with difficulty. In addition, many point comparisons have to be carried out for large correlation windows, whereby the calculation demand in effort and cost increases significantly for carrying out such a process. It may in particular no longer be possible to carry out the process in real time due to the large calculation demand in effort and cost.

It is the underlying object of the invention to provide a method for the three-dimensional detection of objects which also allows a reliable detection of small objects and nevertheless manages with a calculation demand small in effort and cost.

This object is satisfied by a method in accordance with claim 1. The method steps will be explained in more detail in the following.

In accordance with the invention, the method is characterized in that a binarization scheme is applied to the correlation window and to the search windows in the correlation process, in which the respective points of at least one randomly selected point pair are compared to one another within the correlation window and within the search windows, with a respective resultant vector being formed for the correlation window and for the search windows. The method in accordance with the invention is additionally characterized in that a correlation of the resultant vector of the correlation window and of the resultant vectors of the search windows takes place in order to determine the search window which corresponds to the correlation window. The resultant vector of the correlation window can e.g. be compared to the resultant vectors of the search windows on the correlation.

In this respect, randomly selected point pairs are first compared to one another within the correlation window. For example, on the use of gray value images, the brightness of the two points of the point pair can thus be compared, wherein a binary value is produced in dependence on the brightness difference and is introduced into the resultant vector of the correlation window. The length of the resultant vector can correspond to the number of point pairs or to the number of point comparisons carried out within the correlation window. The resultant vector therefore at least has the length one. A brightness distribution in the correlation window can, for example, be imaged onto the resultant vector by means of such point comparisons.

As in the correlation window in the camera image, the mentioned point comparisons are also carried out within the search windows in the reference image, wherein the same point comparisons are carried out in each search window as in the correlation window. This means that the same respective relative positions are compared to one another in the correlation window and in the search windows. The resultant vectors of the search windows and the resultant vector of the correlation window can consequently have the same length.

The correlation window and the search windows can additionally have the same size (that is the same area). The correlation window and the search windows can each be selected as rectangular and/or as congruent.

The invention makes use of the recognition that a resultant vector can be produced by means of the random distribution of the point pairs, said resultant vector describing the respective correlation window or the respective search window in a detailed and meaningful manner. It is therefore possible to also use smaller correlation windows which can reduce the calculation demand in effort and cost for carrying out the method. Smaller objects can thus also be reliably detected and can be relocated in the reference image, whereby the possibility is provided of determining a three-dimensional position of the object by means of triangulation. The method in accordance with the invention thus does not require hardware demanding in effort and cost in order to also detect small objects in a reliable manner.

Hardware costs and calculation time can consequently be saved, since the method in accordance with the invention can make better use of the data produced by existing hardware.

On the basis of the described correlation process, a depth value or a depth offset can therefore be determined for the central point of the correlation window and of the search window which corresponds to the correlation window, said depth value or depth offset being entered into a depth map. The depth value or the spatial position can in this respect, as already described, be calculated by means of triangulation. The at least one point pair is particularly preferably selected by means of a plurality of iterations, with the at least one point pair being reselected randomly for each iteration and that at least one point pair being used for the correlation process which achieves the best association between the correlation window and the search window which corresponds to the correlation window.

In other words, different arrangements of point pairs are compared to one another in order to locate that point pair or those point pairs which achieves or achieve the best correlation between the correlation window and the corresponding search window. The carrying out of the iterations can in this respect already take place in the development process, that is prior to the detection of the scene. For this purpose, 128 randomly selected point pairs can, for example, be used in a first iteration, wherein these point pairs are used for the correlation window and for the search windows and a degree of the correlation between the correlation window and the search window which corresponds to the correlation window is, for example, detected. In subsequent iterations, e.g. 128 point pairs are respectively randomly selected again and are again applied to the same correlation window and to the same search windows (as in the first iteration). Finally, those point pairs which have the best degree of correlation between the correlation window and the search window which corresponds to the correlation window can be used for the method.

The reliability and accuracy of the detection in particular of small objects can be significantly increased by means of the iterations, since an optimization of the selected point pairs takes place by means of the iterations. Alternatively or additionally, not only one correlation window can be examined by the point pairs of each iteration, but a plurality of correlation windows, preferably all possible correlation windows (and thus the associated search windows), can also be examined in order to locate the point pairs which achieve the best association between the correlation window and the associated search window. A denser depth map, which can additionally have less noise, can also be produced due to the improved association (i.e. correlation) which can be achieved in this manner between the correlation window and the search window which corresponds to the correlation window.

Advantageous further embodiments of the invention can be seen from the description, the dependent claims and the drawings.

In accordance with a first advantageous embodiment, the at least one point pair is selected, in particular randomly selected, prior to the detection of the scene, with the point pair being the same for each window. In other words, the point pair can already be selected or fixed in the development process of a system for the three-dimensional detection of objects, which system carries out the method in accordance with the invention. The point pair or the point pairs then remains/remain the same for the service life of the system. This means that the demand in effort and cost for fixing the point pair is shifted to the development process of the system, whereby e.g. no computing power of the system has to be applied during the carrying out of the method.

A plurality of point pairs are preferably used which are distributed uniformly within the correlation window. In other words, the points of the point pairs are distributed substantially uniformly over the area of the correlation window and thus also over the area of the search windows. This means that the point pairs are admittedly selected in a random manner (that is not in accordance with a predefined rule), but nevertheless have to satisfy the named condition of the uniform distribution and are thus distributed uniformly within the correlation window.

In accordance with a further advantageous embodiment, at least 128 point pairs are selected. Therefore, the same respective 128 point comparisons are, for example, carried out within the correlation window and the search windows. Accordingly, the resultant vectors then have the length 128 bits, for example.

In accordance with an alternative embodiment, an upper limit of the number of point pairs can also be defined. A maximum of 64, 128, 256 or 512 point pairs can thus be selected, for example. The selection of exactly 128 point pairs in particular provides a good compromise between a meaningful description of the correlation window or of the search windows by the resultant vectors and of the required computing power.

A respective point (i.e. a pixel) can also be compared to a plurality of other points when selecting the point pairs. In other words, a point can also be included in one or more other point pairs.

The iterations are further preferably carried out using a camera image and a reference image from the illumination pattern of at least one known scene. A known scene is to be understood such that at least some, preferably all, objects present in the scene and thus also the objects imaged onto the images are known. This means that the spatial positions of the objects are likewise known, whereby the search window which corresponds to a respective correlation window is also known in advance. The possibility of checking the correctness of the results achieved in the iterations results from this. The iterations can therefore also be called a simulation, wherein the simulation—as mentioned—can already take place in the development phase and can in particular be carried out purely in software. The use of a known scene makes it possible to improve the result of the iterations again, whereby an association between the correlation window and the corresponding search window can be further optimized, which in turn results in an improved depth map and less noise.

In accordance with the invention, the scene is illuminated by a pattern which is preferably irregular at least locally. This means that the scene is illuminated by a pattern whose pattern structures are repeated at the earliest at a specific spacing or outside the search region. The irregular pattern structures can make it easier to identify mutually corresponding image regions in the first camera image and in the reference image, whereby the correlation of the correlation window and of the search window which corresponds to the correlation window can be facilitated. However, the use of periodic structures or line patterns is generally not excluded.

The illumination preferably takes place using infrared light, in particular infrared laser light, such that the illumination is not perceptible for the human eye. The illumination can e.g. only take place in the period of time in which the image detection devices detect the scene. The scene can in particular be illuminated by at least two illumination devices from two different spatial directions. The influence of reflective areas can be reduced in this manner. The pattern of the illumination can in addition vary with regard to place and with regard to time. The variation in time has to be satisfied. The variation in space is optional.

The point pairs can in particular be adapted to the illumination on the carrying out of iterations for determining the ideal point pairs. In this respect, the combination of iterations and irregular illumination can bring about a strongly pronounced synergetic effect which can significantly increase the reliability and accuracy (i.e. the degree) of the correlation of the correlation window and the associated search window.

In accordance with a further advantageous embodiment, the illumination pattern is also changed in the iterations. In addition to the selection of the point pairs, a further parameter can thus be changed which allows an even better optimization. Generally, the optimization in the iterations can take place in accordance with the best correlation between the correlation window and the search window which corresponds to the correlation window. Alternatively, those point pairs and/or that pattern of the illumination can also be selected which produce/produces the densest depth map, that is which provide/provides the most valid depth information for the total scene and/or produce/produces the smallest error in the depth maps.

In accordance with a further advantageous embodiment, the correlation window and the search windows comprise the same area, with the area being smaller than 0.5%, preferably smaller than 0.1%, particularly preferably smaller than 0.01%, of the area of the camera image and/or of the reference image. The correlation windows and the search windows can, for example, have a size of 5×5 pixels. With a VGA resolution of the image detection device (640×480 pixels), 5×5 pixels correspond to 0.0081% of the area of the respective image. Alternatively, the size of the correlation window and of the search windows can be selected such that an object with a size of 40 mm can, for example, still be recognized in the scene.

The correlation window and the search window can, for example, be configured as rectangular or as square. The correlation window and the search windows are preferably formed in circular shape. This means that the point pairs in the correlation window and in the search windows are only arranged within a circular area. The circular area can, for example, have a radius of 2.3 pixels. A sharpening of the edges of small objects results due to the use of a circular area, which increases the ability of the method to effectively detect objects, in particular small objects. The use of rectangular correlation windows or search windows, in particular square correlation windows or search windows, for example, has a similar effect, with only those pixels which are remote from the respective window center within a corresponding radius then being selected in said correlation windows or search windows. The circular radius can in this respect result from the extent of the minimal object resolution in pixels.

In accordance with a further advantageous embodiment, the correlation of the resultant vector of the correlation window and of the resultant vectors of the search windows takes place with reference to the Hamming distance of the resultant vectors. The Hamming distance can be defined as the number of different positions in a respective two resultant vectors. The resultant vectors used in the method only comprise binary values such that the resultant vector of the correlation window and the resultant vector of a search window which differs at three positions from the resultant vector of the correlation window have a Hamming distance of three. That search window whose resultant vector has the smallest Hamming distance from the resultant vector of the correlation window is considered as the search window which corresponds to the correlation window.

In accordance with a further advantageous embodiment, an aggregate is formed over a plurality of Hamming distances, for example over 3×3 Hamming distances, for adjacent correlation windows. In addition, the correlation preferably takes place using the aggregate. A smoothing takes place by means of the aggregate, that is by means of the summation of e.g. nine Hamming distance values, within the 3×3 region which is selected by way of example, whereby a more reliable object detection can be achieved.

The camera image is preferably rectified and/or is filtered by means of a noise filter. The reference image is already stored and recorded in accordance with the optical reception system. The imaging effects of the optical reception system are preferably also applied to the reference image and stored (e.g. point spread function). Geometrical distortions in the image data are eliminated on the rectification. In this manner, the images can be formed such that the epipolar line for each image extends along the pixels of an image row after the rectification.

The centers of the reference image and of the image detected by the image detection device (or of the corresponding detected regions) as well as a position, that is a point defined by an object, together span a so-called epipolar plane. The epipolar plane intersects the first and second images in a straight line, the so-called epipolar line, in each case.

The noise filter is preferably a filter which, for example, processes 3×3 pixels and is, for example, configured as a low-pass filter or a filter which carries out a Gaussian smoothing. The capability of recognizing objects, in particular small objects, is thereby increased again. Together with the rectification and/or the filtering, the images can additionally be converted into gray value images which comprise a brightness value for each pixel.

The search windows are preferably only arranged along the epipolar line of the reference image. The demand in effort and cost for calculating a plurality of search windows can hereby be reduced, since only search windows along the epipolar line of the respective object or along the epipolar line associated with the center of the respective correlation window have to be compared to the correlation window. Due to the rectification of the images, search windows which correspond to the correlation window then, for example, only lie on the respective epipolar line. The method can be repeated in the first image for all possible correlation windows in order to locate a corresponding search window for each image point (that is the respective central point of the correlation window) such that depth information which can be entered into a depth map can be (gradually) calculated for each image point of the images by means of triangulation.

In a further embodiment of the invention, provision is made to calculate the resultant vectors for the reference image in advance already at the point in time of development or production. The reference image is produced and stored in the development process with reference to the illumination pattern. The reference image can thereby already be provided in the manufacture of the image detection device.

A further subject of the invention is a system for the three-dimensional detection of objects comprising an image detection device, an illumination device and a computing unit. The system in accordance with the invention is characterized in that it is configured to carry out a method of the previously described kind.

A plurality of illumination devices can also be provided. The image detection device can be a digital camera which provides gray value images.

In addition, the system can also have a second camera or a second image detection device. In this case, the method is initially carried out using a camera and the reference image, wherein a detection of objects already takes place here in accordance with the above-described method and a depth map is produced with reference to the detected objects. The method is subsequently repeated with a further combination of the cameras in order to supplement information which may be lacking in the depth map or a lack of information on objects. Such a second or third camera can offer advantages provided that shaded regions are present in the scene which are, for example, only detected by a camera. The invention will be described in the following purely by way of example with reference to the drawings.

Figure 2:
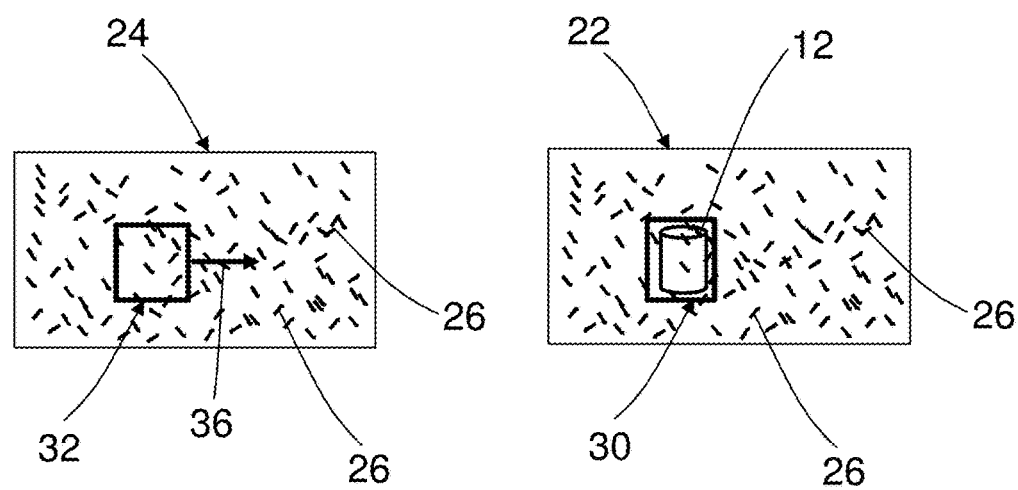
Figure 3:
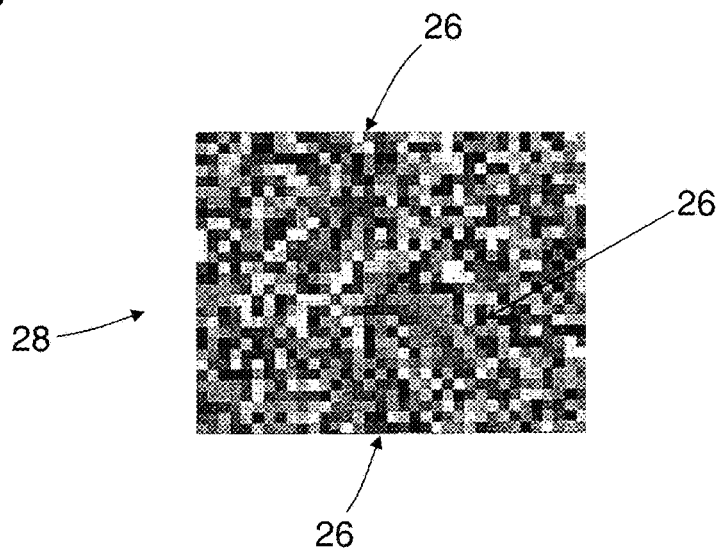
Figure 4:
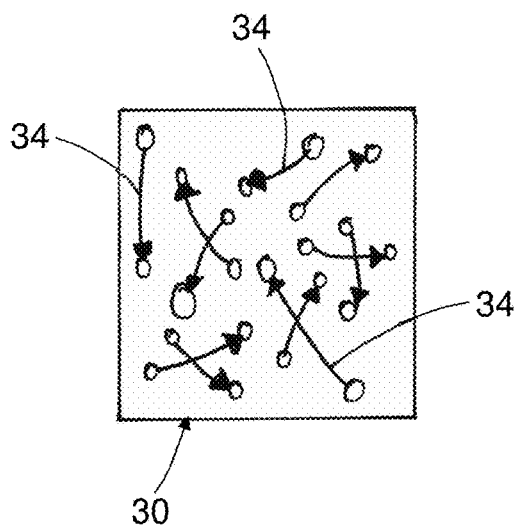

There are shown:

FIG. 1 a system in accordance with the invention for the three-dimensional detection of objects;

FIG. 2 a camera image and a reference image;

FIG. 3 an exemplary irregular illumination pattern;

FIG. 4 a rectangular correlation window; and

Figure 5:
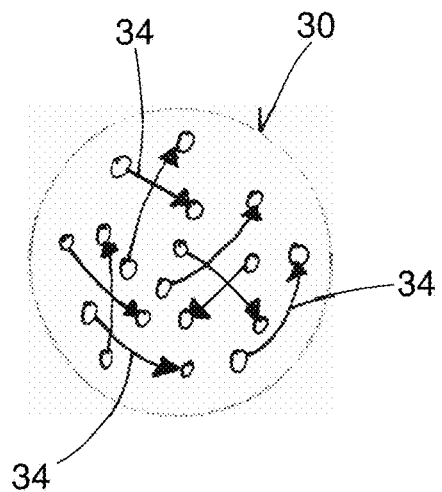

FIG. 5 a circular correlation window.

FIG. 1 shows a system 10 for the three-dimensional detection of an object 12. The system 10 has a camera 14 and an illumination device 20. The camera 14 and the illumination device 20 are directed to a scene 18 in which the object 12 is located. The scene 18 is detected by the camera 14 from another position than illuminated by the illumination device 20. The camera 14 has an angle of observation a within which the scene 18 can be detected.

For example, the illumination device 20 is arranged next to the camera 14 and irradiates laser light in the infrared range. The illumination device 20 irradiates the laser light into an angular range β which is larger than the angle α. The system 10 additionally comprises a computing unit, not shown, which carries out and monitors the operation of the system 10 explained in the following. In operation, the illumination device 20 irradiates the scene 18 and thus also the object 12, while the camera 14 detects images of the scene 18.

A camera image 22 detected by the camera 14 as well as a reference image 24 from the illumination pattern are shown in FIG. 2. In the camera image 22, the image of the object 12 can be recognized approximately in the center. The search windows and correlation windows are at the same respective image coordinates in both images. A search is performed in the reference image starting from these coordinates to the right.

Illumination points 26 which are projected from the illumination device 20 into the scene 18 can be recognized in the camera image 22. The illumination points 26 form an irregular illumination pattern 28 which is shown in more detail in FIG. 3.

The illumination pattern 28 shown in FIG. 3 shows a two-dimensional arrangement of illumination points 26 with different brightness. The illumination pattern 28 here in particular does not have a periodic structure or a line pattern, but is irregular as mentioned.

For an easier understanding, the object 12 is designated by the reference numeral 12 in both the scene 18 (i.e. the object space) and the image 22. In this respect, the reference numeral 12 in the image 22 refers to the respective image of the object 12 there, that is to the image space of the first image 22.

In FIG. 2, a rectangular correlation window 30 is laid around the object 12 in the camera image 22. A search window 32 is drawn in the reference image 24. The correlation window 30 and the search windows 32 are generally of identical design and are shown in more detail in FIGS. 4 and 5. Only a respective correlation window 30 will be spoken of in the following, but the statements are accordingly also true for the search windows 32.

FIG. 4 shows a rectangular correlation window 30 within which a plurality of point pairs 34 are drawn. The arrangement of the point pairs 34 were adapted to the illumination pattern 28 by a plurality of iterations (in accordance with an optimization process) during the development of the system 10 such that objects 12 which are particularly small can also be recognized effectively. A binarization scheme which is defined by the point pairs 34 is applied within the correlation window 30.

Each point pair 34 has a "direction" characterized by an arrow to define the binarization scheme, wherein the order of a comparison of the point pair is fixed by the direction. If the point or pixel is, for example, brighter at the origin of the arrow than the point at the end of the arrow, a one is thus produced as a result for the comparison of this point pair 34. Otherwise, the result of the comparison is a zero.

The result of the binarization scheme is a respective resultant vector for the correlation window 30 and for the search windows 32 which either includes a zero or a one for each pair comparison of each point pair 34, wherein the value included in the resultant vector is the result of the comparison of the respective point pair 34.

Such a binarization scheme can either be applied to a rectangular correlation window 30, as shown in FIG. 4, or to a circular correlation window 30, as shown in FIG. 5. Rectangular or square correlation windows and search windows can also be used in which, however, only those pixels are evaluated which are remote from the respective window center within a circular radius. The circular radius can in this respect result from the minimal object resolution in pixels.

In order, for example, to determine a search window 32 in which the object 12 is likewise present in the images 22, 24 shown in FIG. 2, the binarization scheme is applied to the correlation window 30 by means of the point pairs 34 and a resultant vector is calculated for the correlation window in this manner. Subsequently, every possible search window 32 is evaluated for different search windows 32 which lie along an epipolar line 36, which is only indicated as an arrow in FIG. 2, that is the same binarization scheme as for the correlation window 30 is applied to each search window 32. A separate resultant vector is accordingly calculated for each search window 32.

That search window 32 whose resultant vector has the smallest Hamming distance from the resultant vector of the correlation window 30 is considered as the search window which corresponds to the correlation window, wherein it can be assumed with a high degree of probability that the pattern section imaged onto the object 12 can likewise be seen within this search window 32. The search window 32 which corresponds to the correlation window 30 is accordingly the search window 32 which includes the pattern section corresponding to the object 12.

As the position of the object 12 in both the camera image 22 and the reference image 24 is now known, the spacing of the object 12 from the system 10 in the scene 18 can now be determined by means of a triangulation process and can be entered into a depth map. The method can accordingly be repeated for further objects (not shown).

REFERENCE NUMERAL LIST 10 system
12 object, image of the object
14 camera
18 scene
20 illumination device
22 camera image
24 reference image
26 illumination point
28 illumination pattern
30 correlation window
32 search window
34 point pair
36 epipolar line
α angle of observation
β angular range

The invention claimed is:

1. A method for three-dimensional detection of objects, the method comprising the steps of:
   detecting a scene by means of an image detection device, wherein a camera image is produced;
   illuminating the scene with a pattern, with the pattern being irregular at least locally, and producing an image as a reference image in accordance with the pattern, wherein illumination of the scene with the pattern is performed by an illumination device;
   fixing a correlation window as a section of the camera image;
   fixing a plurality of search windows as sections of a taught reference image, wherein different search windows reproduce different regions of the reference image;
   determining the search window which corresponds to the correlation window by means of a correlation process;
   applying a binarization scheme to the correlation window and to the search windows in the correlation process, and comparing the respective points of at least one randomly selected point pair to one another within the correlation window and within the search windows, with a respective resultant vector formed for the correlation window and for the search windows, and fixing an order of a comparison of the at least one point pair by the resultant vector;
   carrying out a correlation of the resultant vector of the correlation window and of the resultant vectors of the search windows in order to determine the search window which corresponds to the correlation window;
   selecting the at least one randomly selected point pair by means of a plurality of iterations, and randomly reselecting the at least one randomly selected point pair for each iteration and using that at least one randomly selected point pair for the correlation process which achieves the best association between the correlation window and the search window which corresponds to the correlation window;
   determining an object-containing one of the search windows from the best association between the correlation window and the search window which corresponds to the correlation window, the object-containing one of the search windows containing the pattern corresponding to an object of interest; and
   determining and indicating a detection of the object of interest based on the determination of the object-containing one of the search windows.

2. The method in accordance with claim 1, wherein the at least one randomly selected point pair is selected prior to the detection of the scene, with the at least one randomly selected point pair being the same for each window.

3. The method in accordance with claim 1, wherein a plurality of randomly selected point pairs are used which are distributed uniformly within the correlation window.

4. The method in accordance with claim 1, wherein at least 128 randomly selected point pairs are selected.

5. The method in accordance with claim 1, wherein the plurality of iterations are carried out using a camera image and a reference image of at least one known scene.

6. The method in accordance with claim 5, wherein the illumination pattern is also changed in the plurality of iterations.

7. The method in accordance with claim 1, wherein the correlation window and the search windows comprise the same area, with the area being smaller than 0.5% of at least one of the area of the camera image and of the reference image.

8. The method in accordance with claim 1, wherein the correlation window and the search windows comprise the same area, with the area being smaller than 0.1% of at least one of the area of the camera image and of the reference image.

9. The method in accordance with claim 1, wherein the correlation window and the search windows comprise the same area, with the area being smaller than 0.01% of at least one of the area of the camera image and of the reference image.

10. The method in accordance with claim 1, wherein the correlation window and the search windows are formed in circular shape.

11. The method in accordance with claim 1, wherein the correlation of the resultant vector of the correlation window and of the resultant vectors of the search windows takes place with reference to a Hamming distance of the resultant vectors.

12. The method in accordance with claim 11, wherein an aggregate is formed over a plurality of Hamming distances and the correlation takes place using the aggregate.

13. The method in accordance with claim 12, wherein the aggregate is formed over 3×3 Hamming distances.

14. The method in accordance with claim 1, wherein the camera image and the reference image are rectified and/or are filtered by means of a noise filter.

15. The method in accordance with claim 1, wherein the search windows are only arranged along the epipolar line of the reference image.

16. The method in accordance with claim 1, wherein the reference image is produced at the point in time of development or production.

17. A system for the three-dimensional detection of objects, comprising:
   an image detection device;
   an illumination device; and a computing unit, wherein the system is configured to carry out the method of claim 1.

18. The method for three-dimensional detection of objects in accordance with claim 1, further comprising the step of determining a position of the object of interest based on a position of the object-containing one of the search windows.

\* \* \* \* \*